(12) United States Patent
Suyama et al.

(10) Patent No.: US 8,857,875 B2
(45) Date of Patent: Oct. 14, 2014

(54) ROBOT AND ROBOT HAND

(75) Inventors: Takashi Suyama, Fukuoka (JP); Makoto Umeno, Fukuoka (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 89 days.

(21) Appl. No.: 13/487,262

(22) Filed: Jun. 4, 2012

(65) Prior Publication Data

US 2013/0001970 A1 Jan. 3, 2013

(30) Foreign Application Priority Data

Jun. 28, 2011 (JP) ................. 2011-142928

(51) Int. Cl.
*B66C 1/42* (2006.01)
*B25J 15/00* (2006.01)

(52) U.S. Cl.
CPC ............ *B25J 15/0052* (2013.01); *Y10S 901/31* (2013.01)
USPC ....... 294/119.1; 294/86.4; 294/192; 414/741; 901/31

(58) Field of Classification Search
USPC .............. 294/119.1, 86.4, 88, 902, 219, 213, 294/907, 192, 207; 414/741; 901/30–31, 901/37; 269/25, 33
See application file for complete search history.

(56) References Cited

U.S. PATENT DOCUMENTS

| | | | | |
|---|---|---|---|---|
| 6,039,375 A | * | 3/2000 | Bauman | 294/119.1 |
| 7,300,084 B2 | * | 11/2007 | Chae et al. | 294/119.1 |
| 7,401,828 B2 | * | 7/2008 | Yang | 294/119.1 |
| 7,422,411 B2 | * | 9/2008 | Downs et al. | 414/741 |
| 2003/0035711 A1 | * | 2/2003 | Gilchrist | 414/744.5 |

FOREIGN PATENT DOCUMENTS

| | | |
|---|---|---|
| CN | 201333697 Y | 10/2009 |
| EP | 0338673 | 10/1989 |
| JP | 55-066791 U | 5/1980 |
| JP | 58-051990 U | 4/1983 |
| JP | 59-120578 U | 8/1984 |
| JP | 01-222882 | 9/1989 |
| JP | 08-10523 Y2 | 10/1989 |
| JP | 03-019685 U | 2/1991 |
| JP | 04-201080 | 7/1992 |

(Continued)

OTHER PUBLICATIONS

Japanese Office Action for corresponding JP Application No. 2011-142928, Aug. 1, 2013.

(Continued)

*Primary Examiner* — Stephen Vu
(74) *Attorney, Agent, or Firm* — Mori & Ward, LLP

(57) ABSTRACT

A robot includes a robot arm. A robot hand is disposed at a distal end of the robot arm and grips an object. The robot hand includes an air chuck device including a pair of pistons and an air cylinder. The air cylinder opens and closes the pistons in parallel to one another. A pair of first gripping members are disposed at a first side of the pistons and move close to and apart from one another within a first movable range on a movable plane. A pair of second gripping members are disposed at a second side of the pistons and move close to and apart from one another within a second movable range different from the first movable range on the movable plane. The robot hand pivots relative to the distal end of the robot arm about a pivot axis approximately perpendicular to the movable plane.

23 Claims, 9 Drawing Sheets

(56) References Cited

FOREIGN PATENT DOCUMENTS

| | | |
|---|---|---|
| JP | 04-223886 | 8/1992 |
| JP | 05-026286 U | 4/1993 |
| JP | 08-141965 | 6/1996 |
| JP | 09-089904 | 4/1997 |
| JP | 11-277474 | 10/1999 |
| JP | 2005-066762 | 3/2005 |

OTHER PUBLICATIONS

Chinese Office Action for corresponding CN Application No. 201210224316.X, Jun. 5, 2014.

* cited by examiner

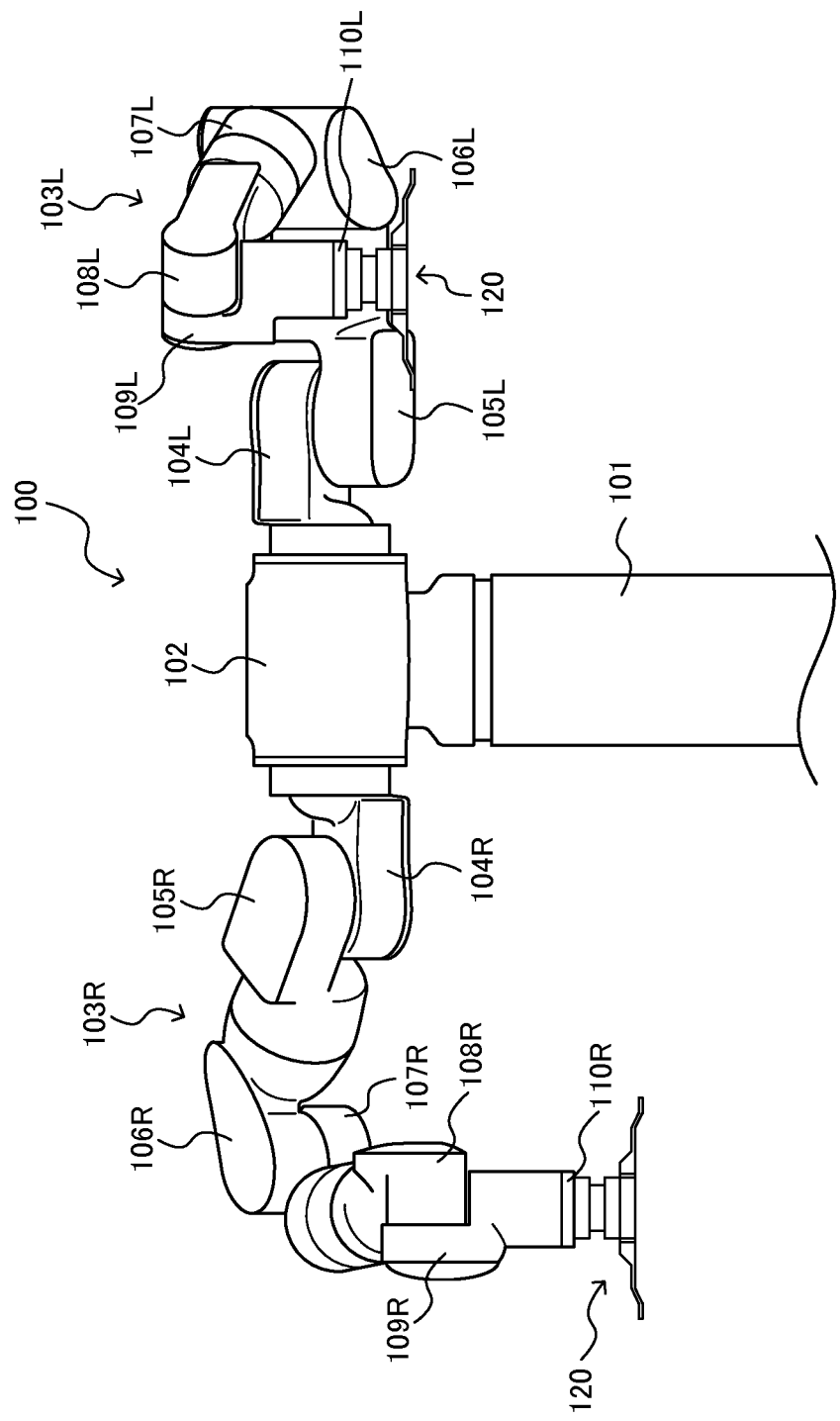

ROBOT AND ROBOT HAND

CROSS-REFERENCE TO RELATED APPLICATIONS

The present application claims priority under 35 U.S.C. §119 to Japanese Patent Application No. 2011-142928, filed Jun. 28, 2011. The contents of this application are incorporated herein by reference in their entirety.

BACKGROUND OF THE INVENTION

1. Field of the Invention

The present invention relates to a robot and a robot hand.

2. Discussion of the Background

Japanese Examined Utility Model Registration Application Publication No. 1996-10523 discloses a robot hand disposed at a distal end of a robot arm to grip an object. The robot hand (gripper) includes two gripping members and an electric motor. The two gripping members are movable close to and apart from one another. The electric motor drives the gripping members.

SUMMARY OF THE INVENTION

According to one aspect of the present invention, a robot includes a robot arm and a robot hand. The robot hand is disposed at a distal end of the robot arm and configured to grip an object. The robot hand includes an air chuck device, a pair of first gripping members, and a pair of second gripping members. The air chuck device includes a pair of pistons and an air cylinder. The pair of pistons each include a first side and a second side. The air cylinder is configured to open and close the pair of pistons in parallel to one another. The pair of first gripping members are disposed at the first side of the pair of pistons and configured to move close to and apart from one another within a first movable range on a movable plane. The pair of second gripping members are disposed at the second side of the pair of pistons and configured to move close to and apart from one another within a second movable range different from the first movable range on the movable plane. The robot hand is configured to pivot relative to the distal end of the robot arm about a pivot axis approximately perpendicular to the movable plane.

According to another aspect of the present invention, a robot hand is pivotably disposed at a distal end of a robot arm so as to grip an object. The robot hand includes an air chuck device, a pair of first gripping members, and a pair of second gripping members. The air chuck device includes a pair of pistons and an air cylinder. The pair of pistons each include a first side and a second side. The air cylinder is configured to open and close the pair of pistons in parallel to one another. The pair of first gripping members are disposed at the first side of the pair of pistons and configured to move close to and apart from one another within a first movable range. The pair of second gripping members are disposed at the second side of the pair of pistons and configured to move close to and apart from one another within a second movable range different from the first movable range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A and 3B are respectively a front view and a top view of a robot;

DESCRIPTION OF THE EMBODIMENTS

Figure 1:
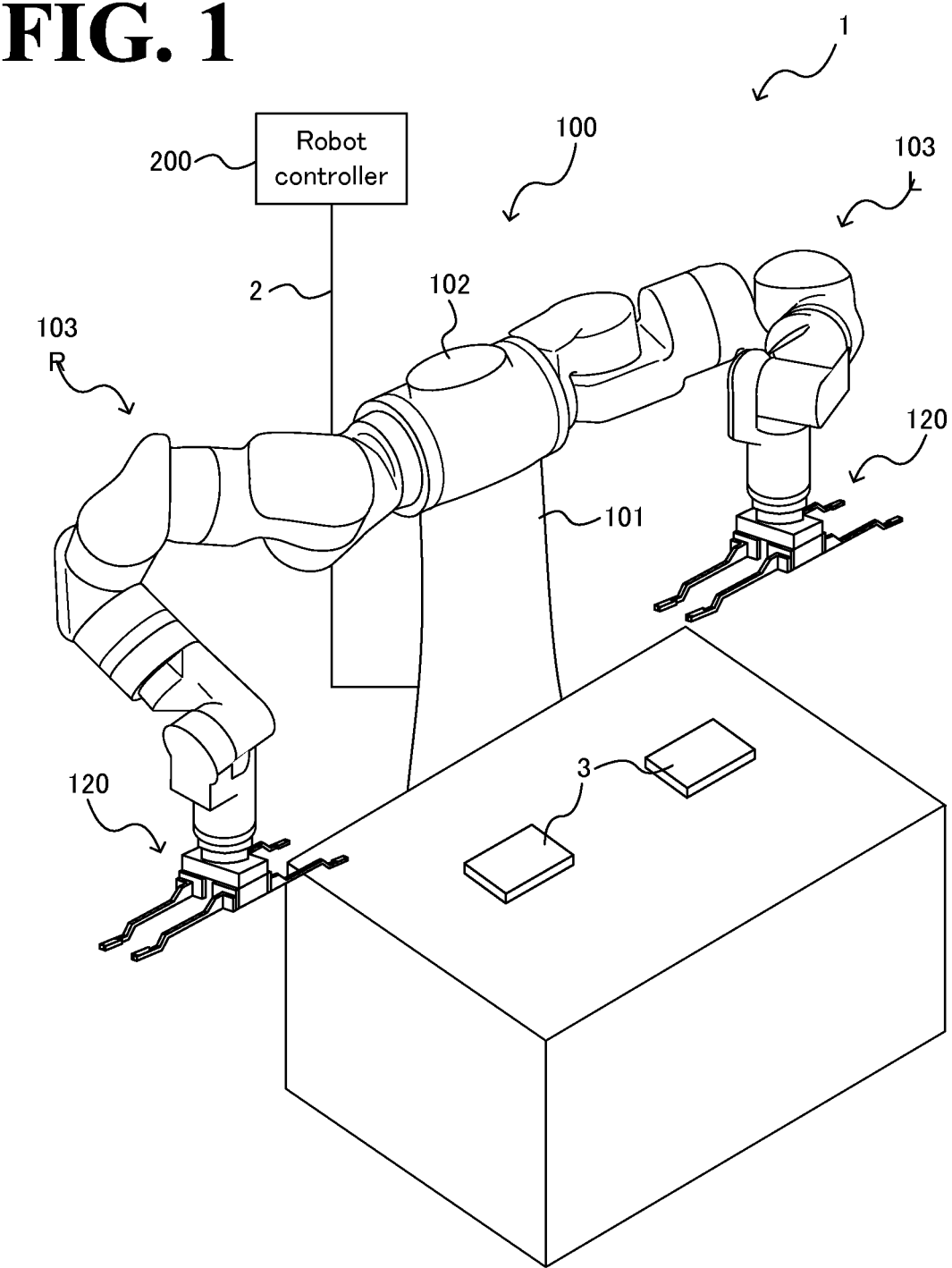
FIG. 1 is a diagram schematically illustrating a robotic system according to an embodiment.

The embodiments will now be described with reference to the accompanying drawings, wherein like reference numerals designate corresponding or identical elements throughout the various drawings.

As shown in FIG. 1, a robotic system 1 according to this embodiment includes a robot 100 and a robot controller 200, which controls the operation of the robot 100. The robot 100 and the robot controller 200 are communicatively coupled to one another through a cable 2 (or the robot 100 and the robot controller 200 may be wirelessly coupled to one another). A robot controller may be disposed at the robot 100 side.

The robot 100 is a dual arm robot, which includes a base 101, a body 102, and two arms 103L and 103R (robot arms). At each distal end of the arms 103L and 103R, a hand 120 (robot hand) is pivotably disposed that grips a microplate 3 (object). The hand 120 may be disposed at only the distal end of one of the arms 103L and 103R (for example, the arm 103L).

Figure 2A:
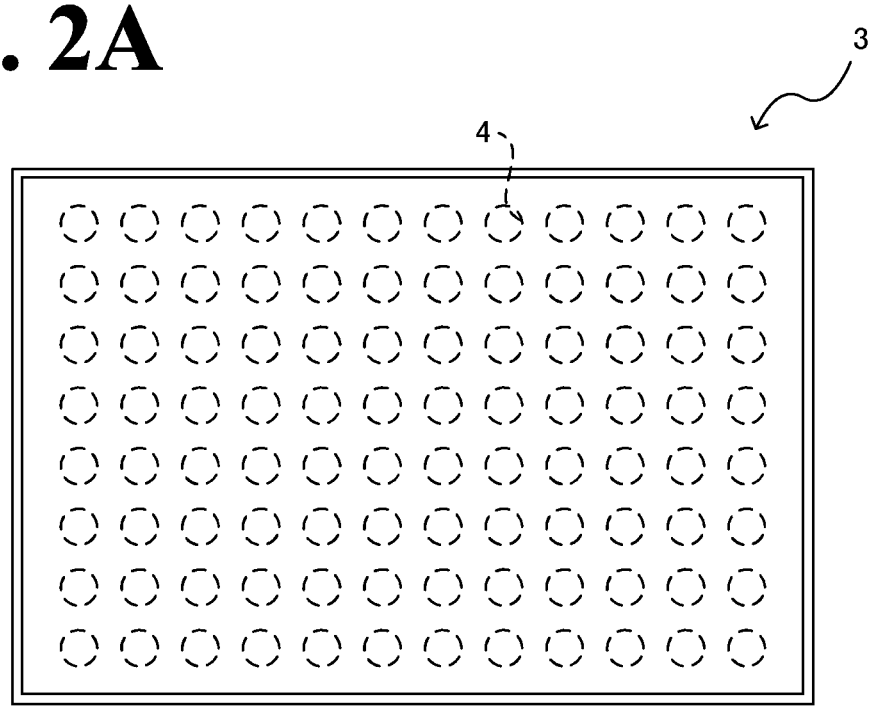
FIGS. 2A and 2B are respectively a top view and a side view of a microplate.
Figure 2B:
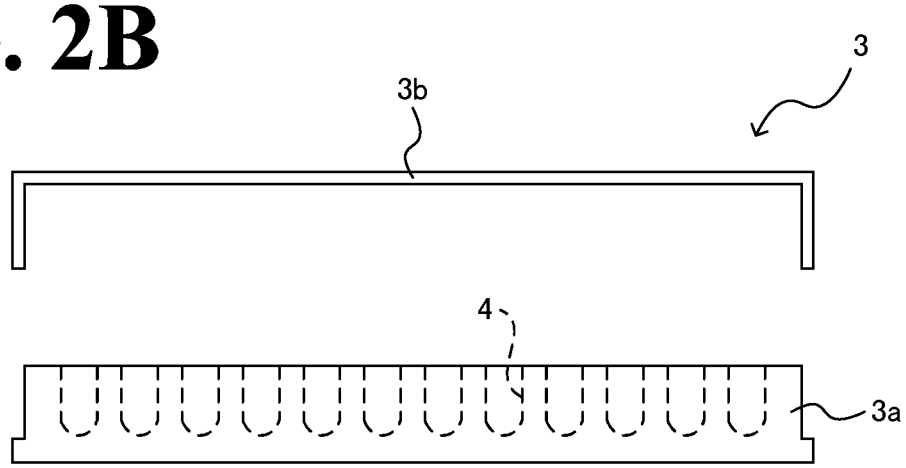

As shown in FIGS. 2A and 2B, the microplate 3 has an approximately rectangular shape in top view. The microplate 3 includes a main body 3a and a lid 3b removably disposed on the top surface side of the main body 3a. The main body 3a includes, over its top surface, a matrix of wells 4 (96 wells in this embodiment), into which solution samples are to be injected.

Figure 3B:
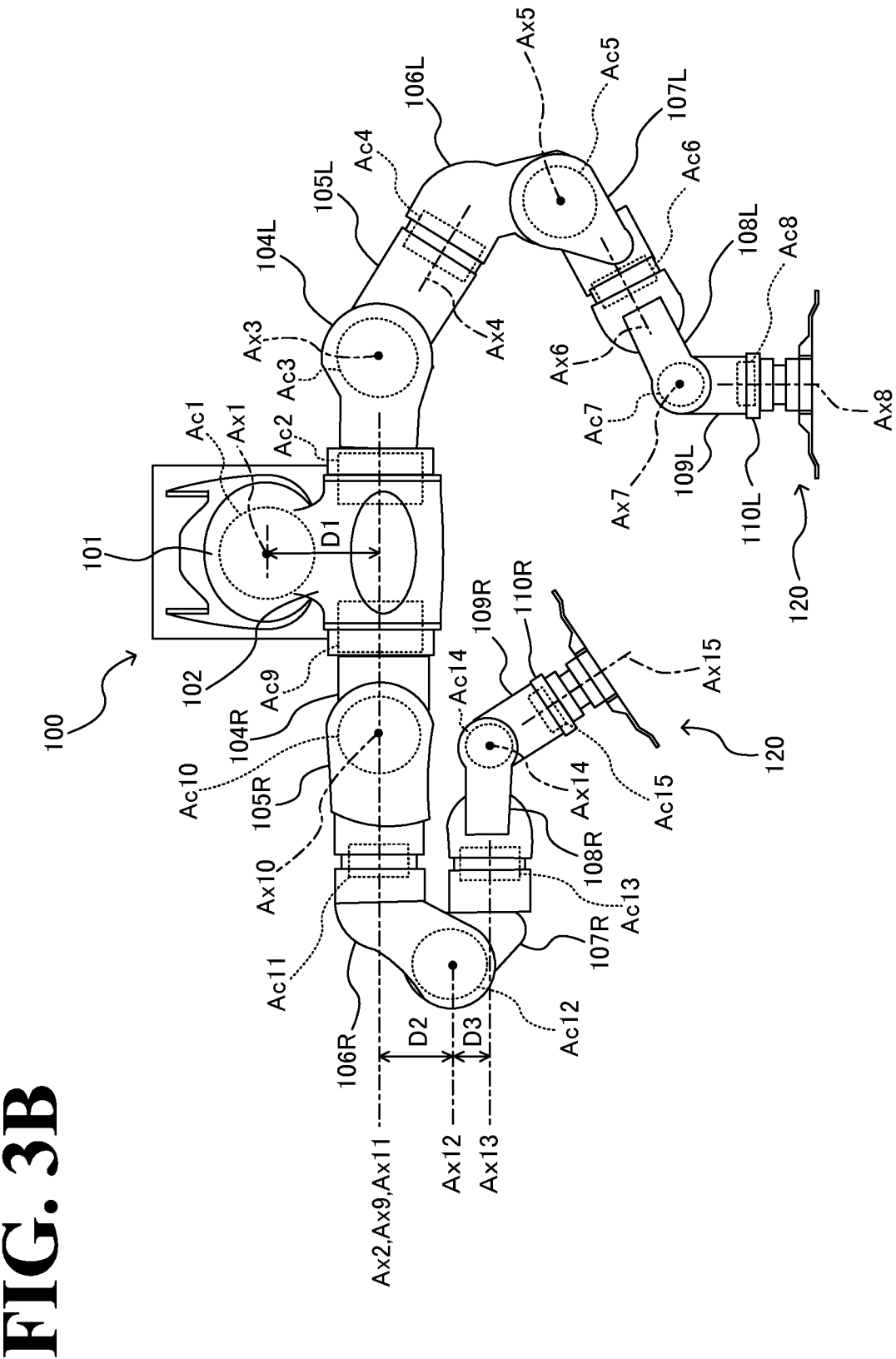

As shown in FIGS. 3A and 3B, the base 101 of the robot 100 is secured to an installation surface (such as a floor) with anchor bolts (not shown) or other securing members.

The body 102 includes a first joint including a first actuator Ac1. The first actuator Ac1 pivotably drives the body 102 about a first pivot axis Ax1, which is approximately perpendicular to the installation surface. The body 102 is coupled to the base 101 via the first joint pivotably about the first pivot axis Ax1. The body 102 supports the arms 103L and 103R respectively at one side and another side of the body 102. The first actuator Ac1 drives the body 102 to pivot about the first pivot axis Ax1 so as to rotate the entire arms 103L and 103R.

The arm 103L includes a shoulder 104L, an upper arm A 105L, an upper arm B 106L, a lower arm 107L, a wrist A 108L, a wrist B 109L, a flange 110L, and second to eighth joints. The second joint includes a second actuator Ac2 to pivotably drive the shoulder 104L. The third joint includes a third actuator Ac3 to pivotably drive the upper arm A 105L. The fourth joint includes a fourth actuator Ac4 to pivotably drive the upper arm B 106L. The fifth joint includes a fifth actuator Ac5 to pivotably drive the lower arm 107L. The sixth joint includes a sixth actuator Ac6 to pivotably drive the wrist A 108L. The seventh joint includes a seventh actuator Ac7 to pivotably drive the wrist B 109L. The eighth joint includes an eighth actuator Ac8 to pivotably drive the flange 110L.

The shoulder 104L is pivotably coupled to the body 102 via the second joint. The shoulder 104L is driven by the second actuator Ac2, which is disposed in the second joint, to pivot about the second pivot axis Ax2, which is approximately parallel to the installation surface. The upper arm A 105L is rotatably coupled to the shoulder 104L via the third joint. The upper arm A 105L is driven by the third actuator Ac3, which is disposed in the third joint, to rotate about the third pivot axis Ax3, which is approximately perpendicular to the second pivot axis Ax2. The upper arm B 106L is pivotably coupled to the upper arm A 105L via the fourth joint. The upper arm B 106L is driven by the fourth actuator Ac4, which is disposed in the fourth joint, to pivot about the fourth pivot axis Ax4, which is approximately perpendicular to the third pivot axis Ax3. The lower arm 107L is rotatably coupled to the upper arm B 106L via the fifth joint. The lower arm 107L is driven by the fifth actuator Ac5, which is disposed in the fifth joint, to rotate about the fifth pivot axis Ax5, which is approximately perpendicular to the fourth pivot axis Ax4. The wrist A 108L is pivotably coupled to the lower arm 107L via the sixth joint. The wrist A 108L is driven by the sixth actuator Ac6, which is disposed in the sixth joint, to pivot about the sixth pivot axis Ax6, which is approximately perpendicular to the fifth pivot axis Ax5. The wrist B 109L is rotatably coupled to the wrist A 108L via the seventh joint. The wrist B 109L is driven by the seventh actuator Ac7, which is disposed in the seventh joint, to rotate about the seventh pivot axis Ax7, which is approximately perpendicular to the sixth pivot axis Ax6. The flange 110L is pivotably coupled to the wrist B 109L via the eighth joint. The flange 110L is driven by the eighth actuator Ac8, which is disposed in the eighth joint, to pivot about the eighth pivot axis Ax8, which is approximately perpendicular to the seventh pivot axis Ax7.

The hand 120 is disposed at a distal end of the flange 110L (that is, at the distal end of the arm 103L). The hand 120 at the distal end of the flange 110L pivots about the eighth pivot axis Ax8 in conjunction with the pivotal movement of the flange 110L about the eighth pivot axis Ax8.

The arm 103R has a similar structure to the structure of the arm 103L. Specifically, the arm 103R includes a shoulder 104R, an upper arm A 105R, an upper arm B 106R, a lower arm 107R, a wrist A 108R, a wrist B 109R, a flange 110R, and ninth to fifteenth joints. The ninth joint includes a ninth actuator Ac9 to pivotably drive the shoulder 104R. The tenth joint includes a tenth actuator Ac10 to pivotably drive the upper arm A 105R. The eleventh joint includes an eleventh actuator Ac11 to pivotably drive the upper arm B 106R. The twelfth joint includes a twelfth actuator Ac12 to pivotably drive the lower arm 107R. The thirteenth joint includes a thirteenth actuator Ac13 to pivotably drive the wrist A 108R. The fourteenth joint includes a fourteenth actuator Ac14 to pivotably drive the wrist B 109R. The fifteenth joint includes a fifteenth actuator Ac15 to pivotably drive the flange 110R.

The shoulder 104R is pivotably coupled to the body 102 via the ninth joint. The shoulder 104R is driven by the ninth actuator Ac9, which is disposed in the ninth joint, to pivot about the ninth pivot axis Ax9, which is approximately parallel to the installation surface. The upper arm A 105R is rotatably coupled to the shoulder 104R via the tenth joint. The upper arm A 105R is driven by the tenth actuator Ac10, which is disposed in the tenth joint, to rotate about the tenth pivot axis Ax10, which is approximately perpendicular to the ninth pivot axis Ax9. The upper arm B 106R is pivotably coupled to the upper arm A 105R via the eleventh joint. The upper arm B 106R is driven by the eleventh actuator Ac11, which is disposed in the eleventh joint, to pivot about the eleventh pivot axis Ax11, which is approximately perpendicular to the tenth pivot axis Ax10. The lower arm 107R is rotatably coupled to the upper arm B 106R via the twelfth joint. The lower arm 107R is driven by the twelfth actuator Ac12, which is disposed in the twelfth joint, to rotate about the twelfth pivot axis Ax12, which is approximately perpendicular to the eleventh pivot axis Ax11. The wrist A 108R is pivotably coupled to the lower arm 107R via the thirteenth joint. The wrist A 108R is driven by the thirteenth actuator Ac13, which is disposed in the thirteenth joint, to pivot about the thirteenth pivot axis Ax13, which is approximately perpendicular to the twelfth pivot axis Ax12. The wrist B 109R is rotatably coupled to the wrist A 108R via the fourteenth joint. The wrist B 109R is driven by the fourteenth actuator Ac14, which is disposed in the fourteenth joint, to turn about the fourteenth pivot axis Ax14, which is approximately perpendicular to the thirteenth pivot axis Ax13. The flange 110R is pivotably coupled to the wrist B 109R via the fifteenth joint. The flange 110R is driven by the fifteenth actuator Ac15, which is disposed in the fifteenth joint, to pivot about the fifteenth pivot axis Ax15, which is approximately perpendicular to the fourteenth pivot axis Ax14.

The hand 120 is disposed at a distal end of the flange 110R (that is, at the distal end of the arm 103R). The hand 120 at the distal end of the flange 110R pivots about the fifteenth pivot axis Ax15 in conjunction with the pivotal movement of the flange 110R about the fifteenth pivot axis Ax15.

In this embodiment, the arms 103L and 103R each have seven joints, that is, seven degrees of freedom, which includes one redundant degree of freedom compared with three translational degrees of freedom with three rotational degrees of freedom. The degrees of freedom will not be limited to seven.

As shown in FIG. 3B, the second pivot axis Ax2 and the ninth pivot axis Ax9 are offset from the first pivot axis Ax1 by a length D1, which is oriented in a direction approximately perpendicular to the installation surface. That is, the part of the body 102 ranging from the first joint to the second joint and the ninth joint protrudes horizontally forward relative to the base 101. This results in a working space below the shoulders 104L and 104R, and enlarges the movable ranges of the arms 103L and 103R with the body 102 pivoting about the pivot axis Ax1.

The shape of the upper arm B 106R is set to ensure that the eleventh pivot axis Ax11 and the twelfth pivot axis Ax12 are offset from one another by a length D2 in top view. The shape of the lower arm 107R is set to ensure that the twelfth pivot axis Ax12 and the thirteenth pivot axis Ax13 are offset from one another by a length D3 in top view. When the arm 103R has such a posture that the eleventh pivot axis Ax11 and the thirteenth pivot axis Ax13 are approximately perpendicular to one another, the length between the eleventh pivot axis Ax11 and the thirteenth pivot axis Ax13 is D2+D3. This ensures that even when the twelfth joint, which corresponds to the human elbow, is bent, a large clearance is left between the lower arm A 107R, which corresponds to the human lower arm, and the upper arm A 105R and the upper arm B 106R, which correspond to the human upper arm. Even when the hand 120 at the distal end of the flange 110R approaches the body 102, the arm 103R has an increased operating degree of freedom.

The above-described structure also applies to the arm 103L, though not elaborated in FIG. 3B. Specifically, the shape of the upper arm B 106L is set to ensure that the fourth pivot axis Ax4 and the fifth pivot axis Ax5 are offset from one another by a length D2 in top view. The shape of the lower arm 107L is set to ensure that the fifth pivot axis Ax5 and the sixth pivot axis Ax6 are offset from one another by a length D3 in top view. When the arm 103L has such a posture that the fourth pivot axis Ax4 and the sixth pivot axis Ax6 are approximately perpendicular to one another, the length between the fourth pivot axis Ax4 and the sixth pivot axis Ax6 is D2+D3.

Figure 4:
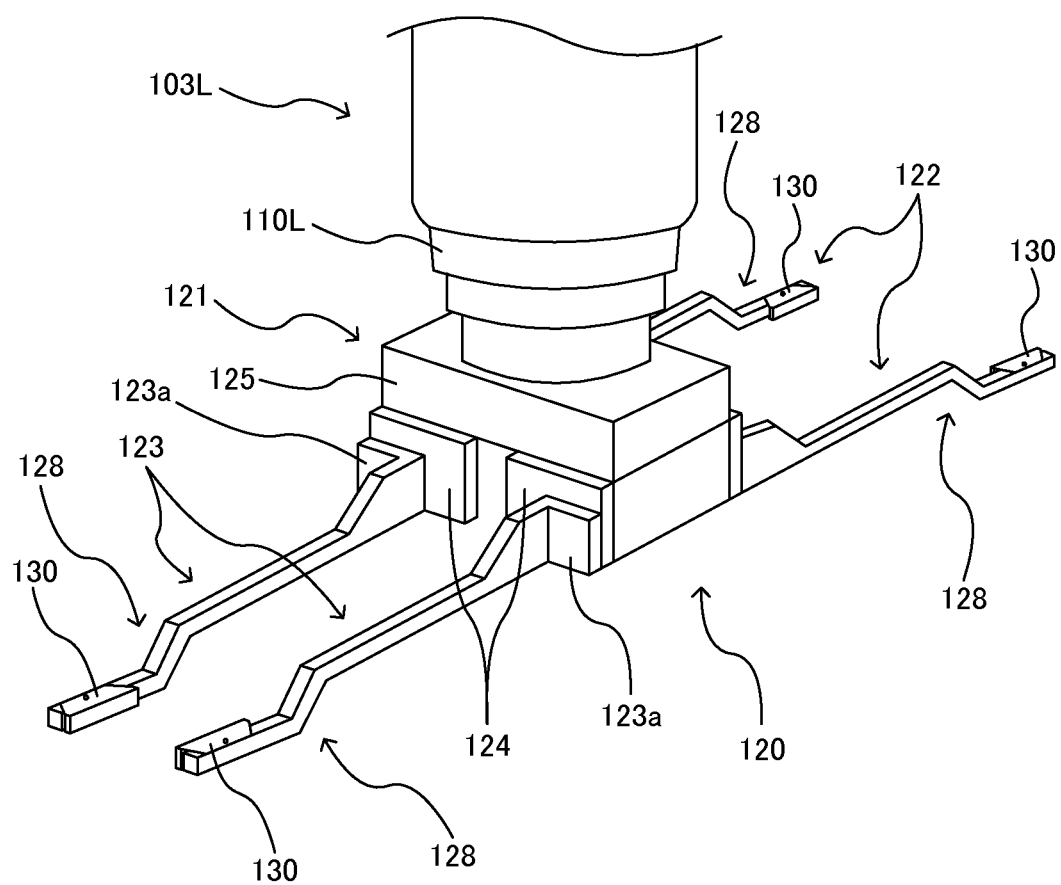
FIG. 4 is an enlarged perspective view of a hand of an arm.
Figure 5:
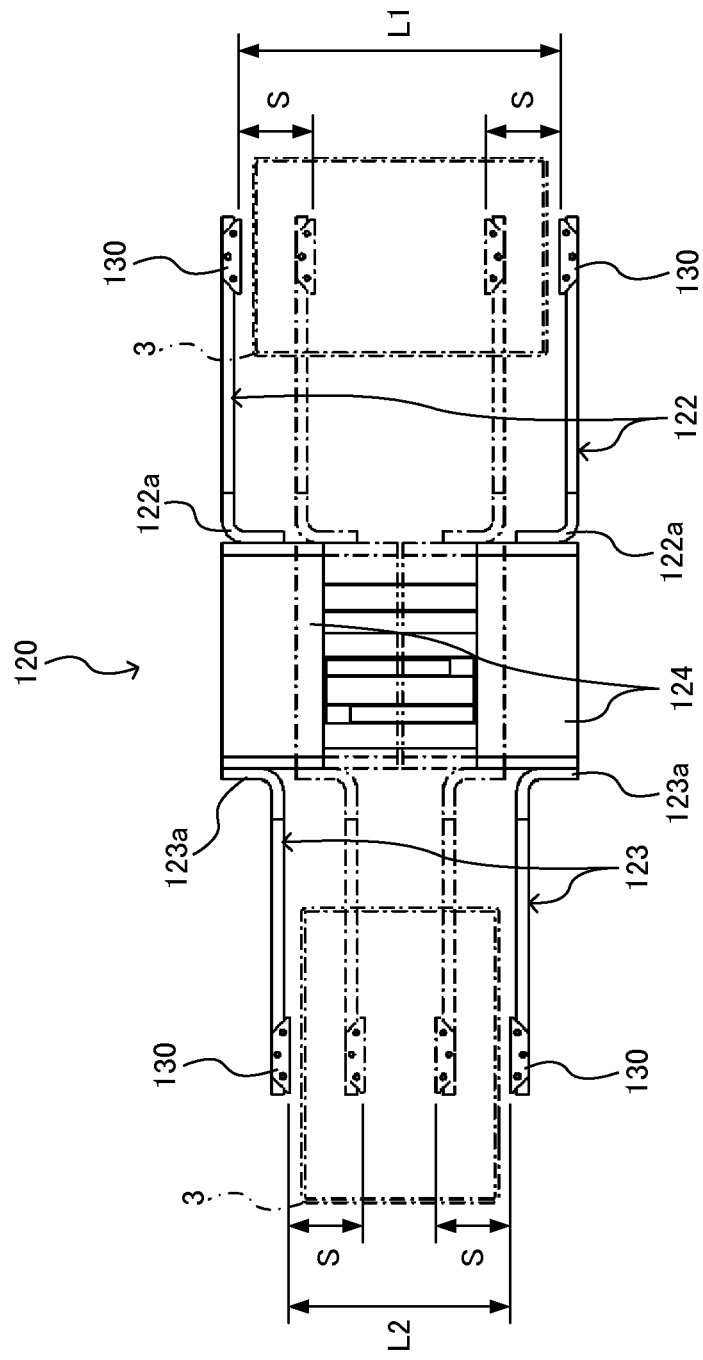
FIG. 5 is a bottom view of the hand.
Figure 6A:
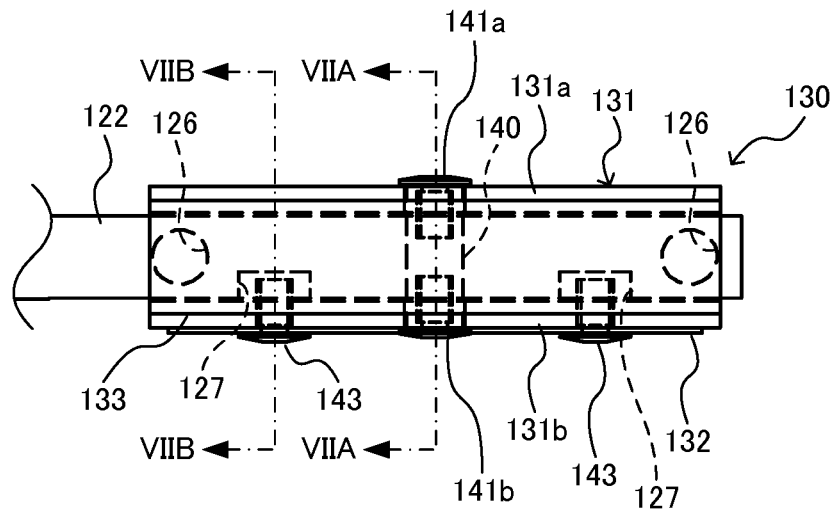
FIGS. 6A, 6B, and 6C are respectively an enlarged side view, an enlarged top view, and an enlarged bottom view of a contact member disposed at a distal end of a longer side gripping member.
Figure 6B:
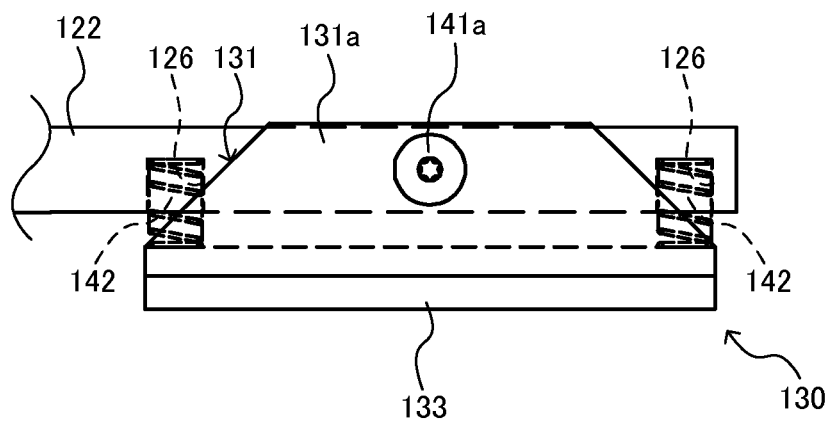
Figure 6C:
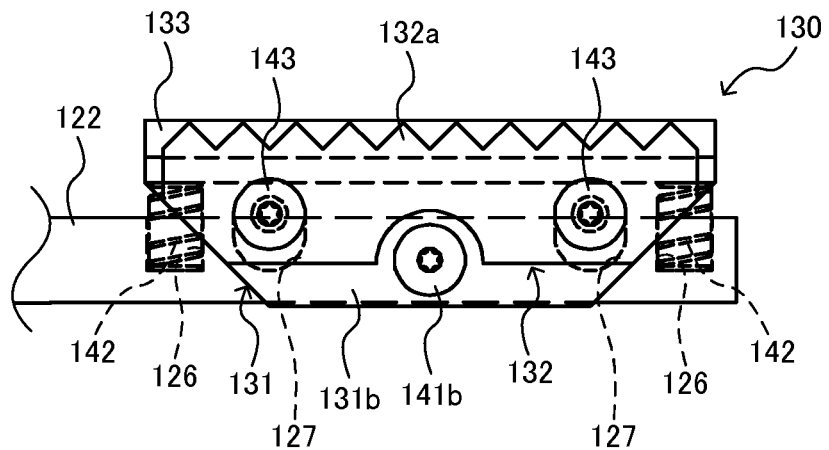
Figure 7A:
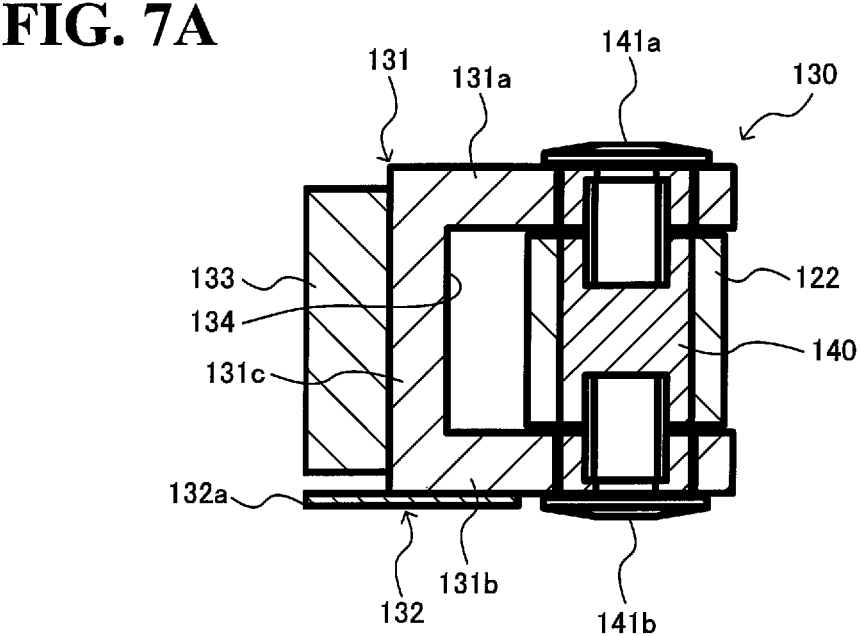
FIG. 7A is a cross-sectional view of the contact member taken along the line VIIA-VIIA of FIG. 6A.
Figure 7B:
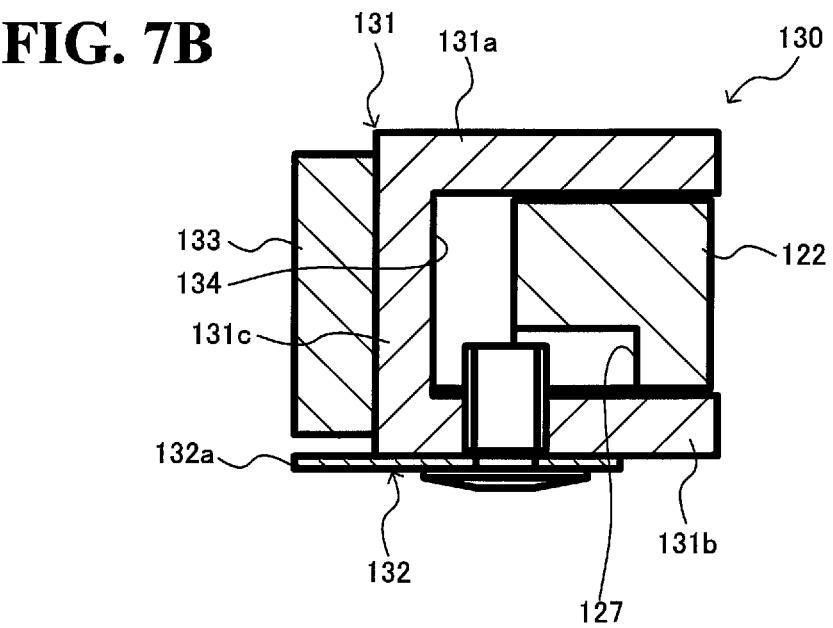
FIG. 7B is a cross-sectional view of the contact member taken along the line VIIB-VIIB of FIG. 6A.

As shown in FIGS. 4 and 5, the hand 120 at the distal end of the flange 110L includes an air chuck device 121, a pair of longer side gripping members 122, and a pair of shorter side gripping members 123. The air chuck device 121 is of known parallel open-close type. The pair of longer side gripping members 122 correspond to first gripping members. The pair of shorter side gripping members 123 correspond to second gripping members. The hand 120 is pivotable about the eighth pivot axis Ax8 relative to the distal end of the flange 110L. The eighth pivot axis Ax8 is approximately perpendicular to the movable plane of the longer side gripping members 122 and the shorter side gripping members 123. That is, the eighth pivot axis Ax8 corresponds to the pivot axis recited in the appended claims.

The air chuck device 121 includes an air cylinder (not shown), a pair of pistons 124, and a mounting plate 125. The air cylinder is driven by pressure of compressed air supplied through a pneumatic tube, not shown. On the mounting plate 125, predetermined devices are to be mounted (examples including, but not limited to, a bar code reader and a suction pad). The air cylinder opens and closes the pair of pistons 124 in parallel to one another.

The pair of the longer side gripping members 122 are secured to one side of the pair of pistons 124 (as seen on the rear-right side in FIG. 4 and the right side in FIG. 5). Specifically, the longer side gripping members 122 have, at their foot ends, flanges 122a that are inwardly bent and secured to the one side of the pair of pistons 124 with bolts (not shown). In conjunction with the open and close operations of the pistons 124, the longer side gripping members 122 move close to and apart from one another within a predetermined movable range L1. The longer side gripping members 122 move at the same stroke as the stroke of the pistons 124 (FIG. 5 shows a maximum stroke S). The movable range L1 of the longer side gripping members 122 is the maximum distance between the longer side gripping members 122 in their fully open state. The minimum distance between the longer side gripping members 122 in their fully closed state is L1-2S. The movable range L1 of the longer side gripping members 122 also corresponds to the longer sides of the microplate 3. Thus, the longer side gripping members 122 are capable of gripping the microplate 3 on its longer sides. That is, the longer side surfaces of the microplate 3 are to be gripped by the longer side gripping members 122.

The pair of the shorter side gripping members 123 are secured to another side of the pair of pistons 124 (as seen on the front-left side in FIG. 4 and the left side in FIG. 5). Specifically, the shorter side gripping members 123 have, at their foot ends, flanges 123a that are outwardly bent and secured to the other side of the pair of pistons 124 with bolts (not shown). In conjunction with the open and close operations of the pistons 124, the shorter side gripping members 123 move close to and apart from one another within a predetermined movable range L2. The shorter side gripping members 123 move at the same stroke as the stroke of the pistons 124 (FIG. 5 shows a maximum stroke S). The movable range L2 of the shorter side gripping members 123 is the maximum distance between the shorter side gripping members 123 in their fully open state. The minimum distance between the shorter side gripping members 123 in their fully closed state is L2-2S. The movable range L2 of the shorter side gripping members 123 is different from the movable range L1 of the longer side gripping members 122. Specifically, the movable range L2 is narrower than the movable range L1 and corresponds to the shorter sides of the microplate 3. Thus, the shorter side gripping members 123 are capable of gripping the microplate 3 on their shorter sides. That is, the shorter side surfaces of the microplate 3 are to be gripped by the shorter side gripping members 123.

The longer side gripping members 122 and the shorter side gripping members 123 each include, at their respective distal ends, a contact member 130 to contact the microplate 3.

As shown in FIGS. 6A, 6B, 6C, 7A, and 7B, the contact members 130 at the distal ends of the longer side gripping members 122 each include a main unit 131, a plate 132, and a rubber 133. The main unit 131 has an approximately U-shaped cross-section.

The main unit 131 includes a top plate 131a, a bottom plate 131b, and a side plate 131c. These plates define a depression 134 to accommodate the distal end of each longer side gripping member 122. That is, the main unit 131 is to face the microplate 3 at the side opposite the side of the depression 134 (as seen on the front side in FIG. 6A, the lower side in FIG. 6B, the upper side in FIG. 6C, and the left side in FIGS. 7A and 7B).

The plate 132 is secured to the lower surface of the bottom plate 131b with two bolts 143. In this respect, the bolts 143 penetrate through the bottom plate 131b and secured in two depressed portions 127 disposed at the distal end side of each longer side gripping member 122. A saw-edged portion 132a is disposed at the edge of the plate 132 on the microplate 3 side. When the longer side gripping members 122 grip the microplate 3, the saw-edged portion 132a bites into the microplate 3. That is, the saw-edged portion 132a is a part of the contact surface of the contact member 130 in contact with the microplate 3. It is noted that disposing the saw-edged portion 132a at the edge of the plate 132 on the microplate 3 side is equivalent to the saw-edged portion 132a serving a part of the contact surface of the contact member 130 to contact the microplate 3.

The rubber 133 is disposed on the side plate 131c on its microplate 3 side. When the longer side gripping members 122 grip the microplate 3, the rubber 133 contacts the microplate 3 with friction. That is, the rubber 133 is also a part of the contact surface of the contact member 130 in contact with the microplate 3. It is noted that disposing the rubber 133 on the side plate 131c on its microplate 3 side is equivalent to the rubber 133 serving a part of the contact surface of the contact member 130 in contact with the microplate 3.

The main unit 131 includes an approximate longitudinal center portion, at which a pin 140 penetrates through the top plate 131a, the longer side gripping member 122, and the bottom plate 131b. The pin 140 is secured with a bolt 141a at the upper end and with a bolt 141b at the lower end so as to prevent displacement of the pin 140. This makes the main unit 131 (in other words, the entire contact member 130) swingable about the longitudinal center portion. When the main unit 131 swings about the longitudinal center portion, the bolts 143 also swing accordingly. The swing of the bolts 143 is ensured by the bolts 143 penetrating through the bottom plate 131b and being inserted into the depressed portions 127 of the longer side gripping member 122, as described above. The longer side gripping member 122 includes spring receiving depressions 126 on a surface of the distal end of the longer side gripping member 122. The spring receiving depressions 126 face the longitudinal ends of the side plate 131c. The spring receiving depressions 126 receive springs 142 extending across the longer side gripping member 122 and the side plate 131c. The springs 142 exert a bias on the main unit 131 toward the microplate 3. This makes the longitudinal ends of the main unit 131 (in other words, the entire contact member 130) biased toward the microplate 3 by the springs 142.

With the longer side gripping member 122 thus configured, the contact member 130 at the distal end of the longer side gripping member 122 operates in the following manner. In the state of the longer side gripping members 122 not gripping the microplate 3, the main unit 131 is biased at its longitudinal ends, keeping the contact member 130 approximately parallel to the corresponding longer side gripping member 122. In the state of the longer side gripping members 122 gripping the microplate 3, the contact member 130 swings about the longitudinal center portion of the main unit 131 with the saw-edged portion 132a and the rubber 133 contacting the microplate 3 in a manner accommodating to the shape of the microplate 3.

While the above-described contact member 130 is regarding the distal end of each longer side gripping member 122, the same contact member 130 applies to the distal end of each shorter side gripping member 123. In the case of the contact member 130 at the distal end of each shorter side gripping member 123, the "shorter side gripping member 123" replaces the "longer side gripping member 122" in the above description of the contact member 130. Accordingly, the contact member 130 at the distal end of each shorter side gripping member 123 will not be elaborated here.

Referring again to FIG. 4, the longer side gripping members 122 and the shorter side gripping members 123 each include a curved portion 128 along each of the longer side gripping members 122 and the shorter side gripping members 123. The curved portion 128 is curved such that the contact member 130 is lower than the curved portion 128 in the direction of height.

Each longer side gripping member 122 is of the same structure as the structure of each shorter side gripping member 123. Accordingly, the pair of longer side gripping members 122 may be used as a pair of shorter side gripping members if the flange sections 122a are bent outwardly. The pair of shorter side gripping members 123 may be used as a pair of longer side gripping members if the flange sections 123a are bent inwardly.

While the above-described hand 120 is regarding the distal end of the flange 110L, the same hand 120 applies to the distal end of the flange 110R. In the case of the hand 120 at the distal end of the flange 110R, the "flange 110R" and the "fifteenth pivot axis Ax15" respectively replace the "flange 110L" and the "eighth pivot axis Ax8" in the above description of the hand 120. Accordingly, the hand 120 at the distal end of the flange 110R will not be elaborated here. That is, the fifteenth pivot axis Ax15 also corresponds to the pivot axis recited in the appended claims.

As has been described hereinbefore, in the robotic system 1 according to this embodiment, the hands 120 at the distal ends of the arms 103L and 103R of the robot 100 each include the air chuck device 121, the pair of longer side gripping members 122, and the pair of shorter side gripping members 123. The longer side gripping members 122 move close to and apart from one another at the same stroke within the movable range L1, while the shorter side gripping members 123 move close to and apart from one another at the same stroke within the movable range L2 different from the movable range L1. This ensures a selection as to which of the gripping members to be used, namely the longer side gripping members 122 or the shorter side gripping members 123, the selection being implemented by the pivotal movement of the hands 120 about the rotation axes Ax8 and Ax15 respectively at the distal ends of the arms 103L and 103R. More specifically, assume that the longer side gripping members 122 are set to move over the wider movable range, while the shorter side gripping members 123 are set to move over the narrower movable range. In this case, when the microplate 3 is to be gripped in portrait orientation as seen in FIG. 5, the longer side gripping members 122 are used, while when the microplate 3 is to be gripped in landscape orientation as seen in FIG. 5, the shorter side gripping members 123 are used. When the hands 120 operate in a strictly limited space within limited movable ranges, the shorter side gripping members 123 are used. When the hands 120 operate in a spacious place within wide movable ranges, the longer side gripping members 122 are used. Thus, the single air chuck device 121 is able to make a selection between two kinds of gripping members, namely the gripping members 122 and 123, depending on the size of the object to be gripped and on the working environment. This improves the versatility of the hands 120. To drive the gripping members 122 and 123 of the hands 120, compressed air is used as a driving source, and this eliminates the need for an additional space that would be necessary in the case of using an electric motor. Additionally, pneumatic tubes through which to supply compressed air are thin compared with power cables for electric motors. Accordingly, thin arms 103L and 103R are ensured, resulting in a downsized robot 100. Thus, this embodiment ensures a downsized robot 100 and downsized hands 120 for use in versatile applications.

It is particularly noted that in this embodiment, each hand 120 grips a rectangular microplate 3. Specifically, the movable range L1 of the longer side gripping members 122 corresponds to the longer sides of the microplate 3, while the movable range L2 of the shorter side gripping members 123 corresponds to the shorter sides of the microplate 3. Thus, the hands 120 are each capable of gripping the rectangular microplate 3 on its longer sides and shorter sides, resulting in improved working efficiency.

It is also particularly noted that in this embodiment, each hand 120 includes the contact members 130 at the distal ends of the longer side gripping members 122 and the shorter side gripping members 123. Each contact member 130 includes the saw-edged portion 132a on a part of the contact surface of the contact member 130 in contact with the microplate 3. When the longer side gripping members 122 and the shorter side gripping members 123 grip the microplate 3, the saw-edged portion 132a bites into the microplate 3. This ensures a firm grip of the microplate 3, with minimal dropping and rotation.

It is also particularly noted that in this embodiment, the contact member 130 includes the rubber 133 as a part of the contact surface of the contact member 130 in contact with the microplate 3. When the longer side gripping members 122 and the shorter side gripping members 123 grip the microplate 3, the rubber 133 causes friction and this eliminates or minimizes dropping and rotation of the microplate 3. It is also particularly noted that the contact member 130 according to this embodiment employs both the saw-edged portion 132a and the rubber 133 on the contact surface of the contact member 130. This ensures that the saw-edged portion 132a bites into the microplate 3 while the rubber 133 contacts the microplate 3 with friction. This further effectively eliminates or minimizes dropping and rotation of the microplate 3.

It is also particularly noted that in this embodiment, the contact member 130 is swingable about its longitudinal center portion. The longitudinal ends of the contact member 130 are biased toward the microplate 3 by the spring 142. In the state of the gripping members 122 and 123 not gripping the microplate 3, the contact member 130 is biased at its longitudinal ends, keeping the contact member 130 approximately parallel to the gripping members 122 and 123. This ensures a reliable fit with the microplate 3 when the gripping members 122 and 123 grip the microplate 3. In the state of the gripping members 122 and 123 gripping the microplate 3, the contact member 130 swings to contact the microplate 3 in a manner accommodating to the shape of the microplate 3. This ensures a flexible grip accommodating to the shape of the microplate 3.

It is also particularly noted that in this embodiment, the longer side gripping members 122 and the shorter side gripping members 123 each include the curved portion 128 along each of the longer side gripping members 122 and the shorter side gripping members 123. The curved portion 128 is curved such that the contact member 130 is lower than the curved portion 128 in the direction of height. This ensures that only the contact members of the longer side gripping members 122 and the shorter side gripping members 123 are to contact the microplate 3, while the rest components of the longer side gripping members 122 and the shorter side gripping members 123 are spaced apart from the microplate 3 and its peripheries (such as the frame of the microplate 3). This keeps the gripping members 122 and 123 from unnecessarily contacting the microplate 3 and associated members. This improves working efficiency.

Modifications will be described below.

Figure 8:
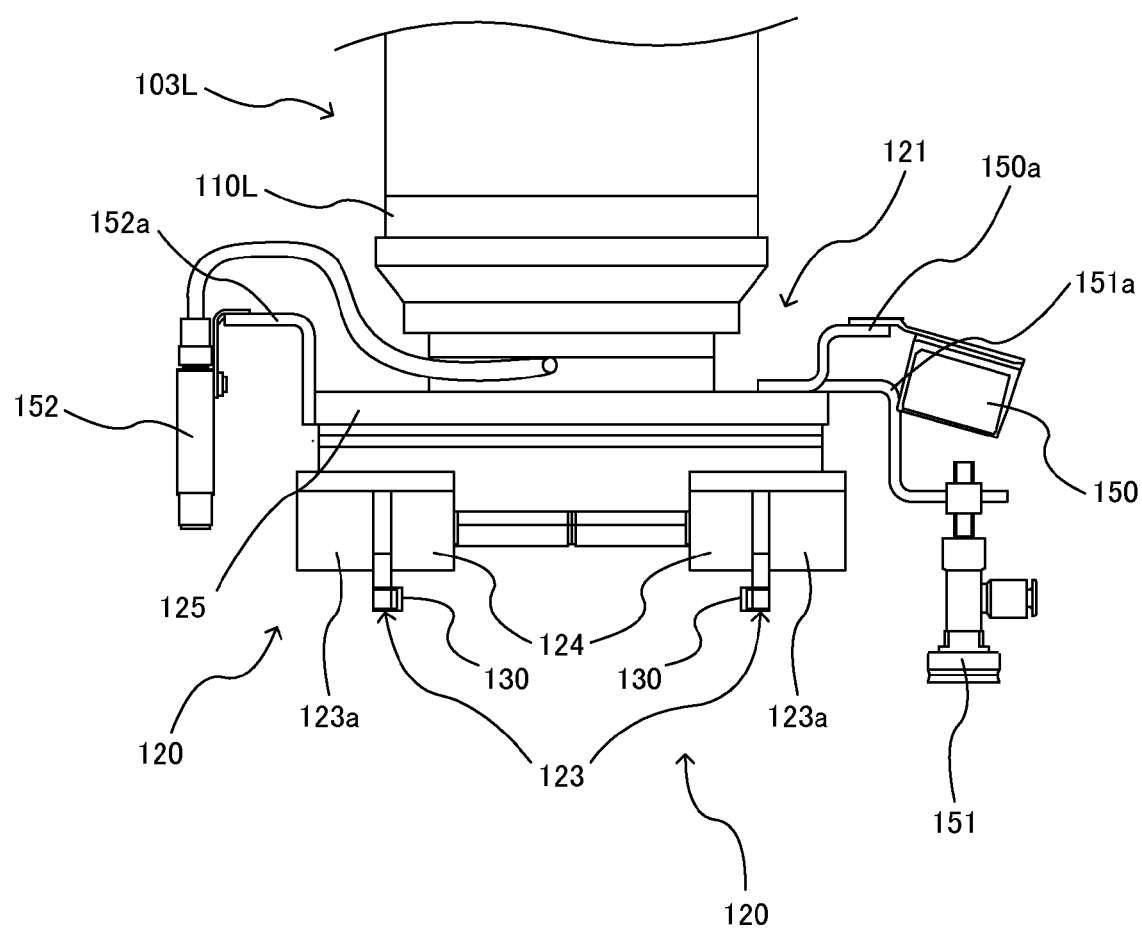
FIG. 8 is an enlarged perspective view of the hand of the arm according to a modification where a device is disposed on a mounting plate.

FIG. 8 shows a hand 120 according to a modification. It should be noted that FIG. 8 shows only the hand 120 disposed at the distal end of the flange 110L of the arm 103L. The hand 120 includes a bar code reader 150 (an identification device), a suction pad 151, and a vacuum device 152 for the suction pad 151. The bar code reader 150 is coupled to the mounting plate 125 of the air chuck device 121 via a supporting member 150a. The suction pad 151 is coupled to the mounting plate 125 via a supporting member 151a. The vacuum device 152 is coupled to the mounting plate 125 via a supporting member 152a.

The bar code reader 150 identifies the microplate 3 when the microplate 3 carries a bar code. Specifically, the bar code reader 150 optically reads information contained in the bar code. The suction pad 151 lifts by sucking the lid 3b of the microplate 3 (see FIGS. 2A and 2B).

The hand 120 is otherwise similar to the hand 120 according to the above-described embodiment.

As in this modification, providing the mounting plate 125 of the air chuck device 121 with the bar code reader 150 ensures identifying the microplate 3 before gripping it. Providing the mounting plate 125 with the suction pad 151 and the vacuum device 152 not only ensures gripping the microplate 3 with the hand 120 but also ensures handling of objects associated with the microplate 3 (such as placing and removing the lid 3b on and off the microplate 3).

In this modification, those disposed on the mounting plate 125 are the bar code reader 150, the suction pad 151, and the vacuum device 152. This, however, should not be construed in a limiting sense. The bar code reader 150 alone may be disposed on the mounting plate 125. Alternatively, the suction pad 151 and the vacuum device 152 alone may be disposed on the mounting plate 125. Still alternatively, other devices than the bar code reader 150, the suction pad 151, and the vacuum device 152 may be disposed on the mounting plate 125.

While in this modification the bar code reader 150 is used as an identification device, this should not be construed in a limiting sense. The identification device may be a camera that identifies the microplate 3 by optically reading information contained in a two-dimensional code such as a QR code (registered trademark). Alternatively, the identification device may be an IC chip reader that identifies the microplate 3 by reading information contained in an IC chip.

In the above-described embodiment and modification, the robot 100 is a dual arm robot with two arms 103L and 103R. This, however, should not be construed in a limiting sense. The robot 100 may be a single arm robot or a robot with three or more arms. These applications also provide similar advantageous effects to those in the above-described embodiment and modification.

While in the above-described embodiment and modification the microplate 3 is a rectangular object, this should not be construed in a limiting sense. The target object to be gripped may be some other rectangular object than the microplate 3 (such as a rectangular substrate). Additionally, the rectangular shape should not be construed in a limiting sense. The target object to be gripped may be oval, for example, instead of being rectangular.

Otherwise, the above-described embodiments and modification embodiment may be combined in any manner deemed suitable.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A robot comprising:
a robot arm; and
a robot hand, at a distal end of the robot arm, configured to grip an object, the robot hand comprising:
an air chuck device comprising:
a pair of pistons each comprising a first side and a second side; and
an air cylinder configured to open and close the pair of pistons in parallel to one another;
a pair of first gripping members secured to the first sides of the pair of pistons, configured to move close to and apart from one another within a first movable range on a movable plane; and
a pair of second gripping members secured to the second sides of the pair of pistons, configured to move close to and apart from one another within a second movable range different from the first movable range on the movable plane, the robot hand being configured to pivot relative to the distal end of the robot arm about a pivot axis approximately perpendicular to the movable plane,
wherein the pair of pistons comprise a first piston having a first side and a second side, and a second piston having a first side and a second side,
wherein the pair of first gripping members are respectively secured to the first side of the first piston and the first side of the second piston at a first distance apart from one another, and
wherein the pair of second gripping members are respectively secured to the second side of the first piston and the second side of the second piston at a second distance apart from one another, the second distance being greater than the first distance.

2. The robot according to claim 1,
wherein the robot hand is configured to grip a rectangular object, and
wherein the first movable range of the pair of first gripping members corresponds to a longer side of the rectangular object, while the second movable range of the second gripping members corresponds to a shorter side of the rectangular object.

3. The robot according to claim 2, wherein the robot hand comprises
a first contact member at a distal end of each of the pair of first gripping members, the first contact member being configured to contact the object and comprising a saw-edged portion on at least a part of a contact surface of the first contact member in contact with the object, and
a second contact member at a distal end of each of the pair of second gripping members, the second contact member being configured to contact the object and comprising a saw-edged portion on at least a part of a contact surface of the second contact member in contact with the object.

4. The robot according to claim 3, wherein the robot hand comprises
a first contact member at a distal end of each of the pair of first gripping members, the first contact member being configured to contact the object and comprising a rubber member on at least a part of a contact surface of the first contact member in contact with the object, and
a second contact member at a distal end of each of the pair of second gripping members, the second contact member being configured to contact the object and comprising a rubber member on at least a part of a contact surface of the second contact member in contact with the object.

5. The robot according to claim 3, wherein the robot hand comprises
a first contact member at a distal end of each of the pair of first gripping members, the first contact member being configured to contact the object and comprising a longitudinal center portion about which the first contact member is swingable and comprising longitudinal ends biased toward the object, and
a second contact member at a distal end of each of the pair of second gripping members, the second contact member being configured to contact the object and comprising a longitudinal center portion about which the second contact member is swingable and comprising longitudinal ends biased toward the object.

6. The robot according to claim 3, wherein the robot hand comprises
a first contact member at a distal end of each of the pair of first gripping members, the first contact member being configured to contact the object and comprising a longitudinal center portion about which the first contact member is swingable and comprising longitudinal ends biased toward the object, and
a second contact member at a distal end of each of the pair of second gripping members, the second contact member being configured to contact the object and comprising a longitudinal center portion about which the second contact member is swingable and comprising longitudinal ends biased toward the object.

7. The robot according to claim 2, wherein the robot hand comprises
a first contact member at a distal end of each of the pair of first gripping members, the first contact member being configured to contact the object and comprising a rubber member on at least a part of a contact surface of the first contact member in contact with the object, and
a second contact member at a distal end of each of the pair of second gripping members, the second contact member being configured to contact the object and comprising a rubber member on at least a part of a contact surface of the second contact member in contact with the object.

8. The robot according to claim 7, wherein the robot hand comprises
a first contact member at a distal end of each of the pair of first gripping members, the first contact member being configured to contact the object and comprising a longitudinal center portion about which the first contact member is swingable and comprising longitudinal ends biased toward the object, and
a second contact member at a distal end of each of the pair of second gripping members, the second contact member being configured to contact the object and comprising a longitudinal center portion about which the second contact member is swingable and comprising longitudinal ends biased toward the object.

9. The robot according to claim 2, wherein the robot hand comprises
a first contact member at a distal end of each of the pair of first gripping members, the first contact member being configured to contact the object and comprising a longitudinal center portion about which the first contact member is swingable and comprising longitudinal ends biased toward the object, and
a second contact member at a distal end of each of the pair of second gripping members, the second contact member being configured to contact the object and comprising a longitudinal center portion about which the second contact member is swingable and comprising longitudinal ends biased toward the object.

10. The robot according to claim 1, wherein the robot hand comprises
a first contact member at a distal end of each of the pair of first gripping members, the first contact member being configured to contact the object and comprising a saw-edged portion on at least a part of a contact surface of the first contact member in contact with the object, and
a second contact member at a distal end of each of the pair of second gripping members, the second contact member being configured to contact the object and comprising a saw-edged portion on at least a part of a contact surface of the second contact member in contact with the object.

11. The robot according to claim 10, wherein the robot hand comprises
a first contact member at a distal end of each of the pair of first gripping members, the first contact member being configured to contact the object and comprising a rubber member on at least a part of a contact surface of the first contact member in contact with the object, and
a second contact member at a distal end of each of the pair of second gripping members, the second contact member being configured to contact the object and comprising a rubber member on at least a part of a contact surface of the second contact member in contact with the object.

12. The robot according to claim 11, wherein the robot hand comprises
a first contact member at a distal end of each of the pair of first gripping members, the first contact member being configured to contact the object and comprising a longitudinal center portion about which the first contact member is swingable and comprising longitudinal ends biased toward the object, and
a second contact member at a distal end of each of the pair of second gripping members, the second contact member being configured to contact the object and comprising a longitudinal center portion about which the second contact member is swingable and comprising longitudinal ends biased toward the object.

13. The robot according to claim 10, wherein the robot hand comprises a first contact member at a distal end of each of the pair of first gripping members, the first contact member being configured to contact the object and comprising a longitudinal center portion about which the first contact member is swingable and comprising longitudinal ends biased toward the object, and a second contact member at a distal end of each of the pair of second gripping members, the second contact member being configured to contact the object and comprising a longitudinal center portion about which the second contact member is swingable and comprising longitudinal ends biased toward the object.

14. The robot according to claim 1, wherein the robot hand comprises a first contact member at a distal end of each of the pair of first gripping members, the first contact member being configured to contact the object and comprising a rubber member on at least a part of a contact surface of the first contact member in contact with the object, and a second contact member at a distal end of each of the pair of second gripping members, the second contact member being configured to contact the object and comprising a rubber member on at least a part of a contact surface of the second contact member in contact with the object.

15. The robot according to claim 14, wherein the pair of first gripping members each comprise a first curved portion along each of the pair of first gripping members, the first curved portion being curved such that the first contact member is lower than the first curved portion in a direction of height, and wherein the pair of second gripping members each comprise a second curved portion along each of the pair of second gripping members, the second curved portion being curved such that the second contact member is lower than the second curved portion in the direction of height.

16. A robot comprising:

a robot arm; and a robot hand, at a distal end of the robot arm, configured to grip an object, the robot hand comprising:

an air chuck device comprising:

a pair of pistons each comprising a first side and a second side; and an air cylinder configured to open and close the pair of pistons in parallel to one another;

a pair of first gripping members, at the first side of the pair of pistons, configured to move close to and apart from one another within a first movable range on a movable plane; and a pair of second gripping members, at the second side of the pair of pistons, configured to move close to and apart from one another within a second movable range different from the first movable range on the movable plane, the robot hand being configured to pivot relative to the distal end of the robot arm about a pivot axis approximately perpendicular to the movable plane, wherein the robot hand comprises a first contact member at a distal end of each of the pair of first gripping members, the first contact member being configured to contact the object and comprising a longitudinal center portion about which the first contact member is swingable and comprising longitudinal ends biased toward the object, and a second contact member at a distal end of each of the pair of second gripping members, the second contact member being configured to contact the object and comprising a longitudinal center portion about which the second contact member is swingable and comprising longitudinal ends biased toward the object.

17. The robot according to claim 16, wherein the pair of first gripping members each comprise a first curved portion along each of the pair of first gripping members, the first curved portion being curved such that the first contact member is lower than the first curved portion in a direction of height, and wherein the pair of second gripping members each comprise a second curved portion along each of the pair of second gripping members, the second curved portion being curved such that the second contact member is lower than the second curved portion in the direction of height.

18. A robot comprising:

a robot arm; and a robot hand, at a distal end of the robot arm, configured to grip an object, the robot hand comprising:

an air chuck device comprising:

a pair of pistons each comprising a first side and a second side; and an air cylinder configured to open and close the pair of pistons in parallel to one another;

a pair of first gripping members, at the first side of the pair of pistons, configured to move close to and apart from one another within a first movable range on a movable plane; and a pair of second gripping members, at the second side of the pair of pistons, configured to move close to and apart from one another within a second movable range different from the first movable range on the movable plane, the robot hand being configured to pivot relative to the distal end of the robot arm about a pivot axis approximately perpendicular to the movable plane, wherein the robot hand comprises a first contact member at a distal end of each of the pair of first gripping members, and a second contact member at a distal end of each of the pair of second gripping members, wherein the pair of first gripping members each comprise a first curved portion along each of the pair of first gripping members, the first curved portion being curved such that the first contact member is lower than the first curved portion in a direction of height, and wherein the pair of second gripping members each comprise a second curved portion along each of the pair of second gripping members, the second curved portion being curved such that the second contact member is lower than the second curved portion in the direction of height.

19. The robot according to claim 18, wherein the first contact member is configured to contact the object and comprises a saw-edged portion on at least a part of a contact surface of the first contact member in contact with the object, and wherein the second contact member is configured to contact the object and comprises a saw-edged portion on at least a part of a contact surface of the second contact member in contact with the object.

20. The robot according to claim 18, wherein the first contact member is configured to contact the object and comprises a rubber member on at least a part of a contact surface of the first contact member in contact with the object, and wherein the second contact member is configured to contact the object and comprises a rubber member on at least a part of a contact surface of the second contact member in contact with the object.

21. The robot according to claim 18, wherein the first contact member is configured to contact the object and comprises a longitudinal center portion about which the first contact member is swingable and comprises longitudinal ends biased toward the object, and wherein the second contact member is configured to contact the object and comprises a longitudinal center portion about which the second contact member is swingable and comprises longitudinal ends biased toward the object.

22. A robot comprising:

a robot arm; and a robot hand, at a distal end of the robot arm, configured to grip an object, the robot hand comprising:
an air chuck device comprising:
a pair of pistons each comprising a first side and a second side; and
an air cylinder configured to open and close the pair of pistons in parallel to one another;
a pair of first gripping members, at the first side of the pair of pistons, configured to move close to and apart from one another within a first movable range on a movable plane; and
a pair of second gripping members, at the second side of the pair of pistons, configured to move close to and apart from one another within a second movable range different from the first movable range on the movable plane, the robot hand being configured to pivot relative to the distal end of the robot arm about a pivot axis approximately perpendicular to the movable plane, wherein the air chuck device comprises a mounting plate on which to mount at least one of an identification device configured to identify the object, a suction pad, and a vacuum device for the suction pad.

23. A robot hand pivotably disposed at a distal end of a robot arm so as to grip an object, the robot hand comprising:
an air chuck device comprising:
a pair of pistons each comprising a first side and a second side; and
an air cylinder configured to open and close the pair of pistons in parallel to one another;
a pair of first gripping members secured to the first sides of the pair of pistons, configured to move close to and apart from one another within a first movable range; and
a pair of second gripping members secured to the second sides of the pair of pistons, configured to move close to and apart from one another within a second movable range different from the first movable range, wherein the pair of pistons comprise a first piston having a first side and a second side, and a second piston having a first side and a second side, wherein the pair of first gripping members are respectively secured to the first side of the first piston and the first side of the second piston at a first distance apart from one another, and wherein the pair of second gripping members are respectively secured to the second side of the first piston and the second side of the second piston at a second distance apart from one another, the second distance being greater than the first distance.

* * * * *